UNITED STATES PATENT OFFICE.

WILLIAM L. HORNE, OF MERIDEN, ASSIGNOR TO THE HORNE VACUUM COMPANY, OF HARTFORD, CONNECTICUT.

ALCOHOLIC DISTILLATION.

SPECIFICATION forming part of Letters Patent No. 419,332, dated January 14, 1890.

Application filed February 16, 1888. Serial No. 264,244. (No specimens.)

*To all whom it may concern:*

Be it known that I, WILLIAM L. HORNE, a citizen of the United States, residing at Meriden, in the county of New Haven and State of Connecticut, have invented certain new and useful Improvements in Alcoholic Distillation; and I do hereby declare the following to be a full, clear, and exact description of the invention, such as will enable others skilled in the art to which it appertains to make and use the same.

My invention relates to the manufacture or distillation of whisky or like liquor from the fermented mash from grain or malt or from a mixture of this or analogous articles. It is universally conceded that there is a considerable waste and loss in the ordinary processes, in that not all the constituents of the materials which are capable of being converted into alcohol are so converted during the period allowed for fermentation. One reason for this is that not all of such particles are in such condition as to be converted into alcohol within the same period, and while the greater part has been converted other portions have not been; but as loss would occur by acetic fermentation setting in the wort is transferred to the still, notwithstanding that there are in it saccharine and starchy particles which are unconverted. It has been attempted to save this waste and render the operation more economical by using the spent beer or slop from the still to form a new mash for fermentation; but this is only partially successful and entails so much labor and additional expense, and the heat to which the beer or wort is subjected in the still acts to carry some of the particles beyond the fermentation-point, that this process has not come greatly in use. My improved process is designed to remedy the evils of these processes and to so treat the wort that the waste or loss shall be reduced to a minimum and the yield be thereby increased.

In my process the mash is prepared and fermented as in ordinary methods, and at a point of the fermentation before any portion of the alcoholic product has been lost by the beginning of acid fermentation the wort is transferred to a vacuum-still and the alcohol distilled off without raising the liquor to such temperature as will effect any of the constituents of the mash or wort in such a way as to prevent or retard further fermentation. In other words, the raising of the mash or wort to such a degree of heat as will cook the starchy or other particles must be avoided. In the process as I have carried it out the temperature within the still is never above 100° Fahrenheit; but probably a temperature of at least 150° might be reached and good results attained. When the alcohol has been removed from the wort, the latter is returned to the fermentation-vat and the fermentation allowed to proceed until all the convertible portions of the wort have been transformed into alcohol, when the wort is again placed in the still and the alcohol distilled therefrom. The amount of alcoholic products obtained from the second distillation is less than that obtained from the first; but I have found this second distillation profitable, and the two distillations produce a yield largely in excess of the amount obtained by present processes. I have also found that by returning the wort to the fermentation-vat after this second distillation and adding thereto saccharine material and permitting the liquor to again ferment I can obtain an alcoholic product which cannot be distinguished from the product of the preceding distillations, it having all the essential flavors and characteristics of the first distillation and costing far less. This addition of saccharine matter, the refermentation, and redistillation may be carried on as long as desired or as long as the liquor remains sufficiently liquid to permit the operation.

I do not claim the use of the spent wort or slop of the processes of distillation, by vaporizing the alcohol by boiling the wort in a still and cooking the same, in the formation of a new mash with malt or cereal materials; but

What I claim, and desire to secure by Letters Patent, is—

1. The process of obtaining alcoholic products, which consists in forming a new mash from grain materials, fermenting the same, then distilling the wort before the appearance of acid fermentation by vacuum distillation at low temperature, then subjecting the residual liquor or wort in the still to further ferment without addition of other grain material, and then distilling the refermented wort in like manner, substantially as described.

2. The process of obtaining alcoholic products, which consists in forming a mash from grain materials, fermenting the same, distilling the fermented liquor or wort before acid fermentation has set in by vacuum distillation at a low temperature, then adding saccharine matter to the wort and refermenting the same, and then distilling the refermented wort, substantially as described.

In testimony whereof I affix my signature in presence of two witnesses.

WM. L. HORNE.

Witnesses:
L. R. WHITAKER,
WM. R. MACK.